Figure 1:
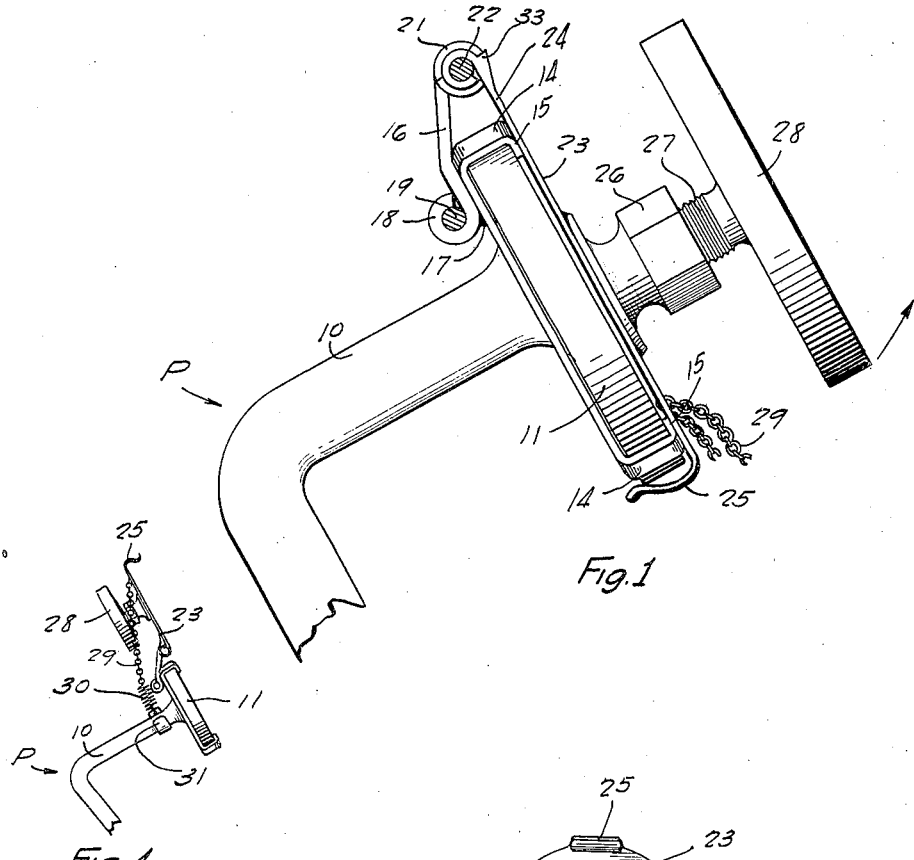

July 19, 1938.  V. P. BAILEY  2,124,100

PEDAL EXTENSION

Filed July 14, 1937

INVENTOR.
Vivian Pinnock Bailey
BY Joshua T. H. Potts
ATTORNEY.

Patented July 19, 1938

2,124,100

UNITED STATES PATENT OFFICE 2,124,100

PEDAL EXTENSION

Vivian Pinnock Bailey, Philadelphia, Pa.

Application July 14, 1937, Serial No. 153,502

5 Claims. (Cl. 74—562)

This invention relates to pedal extensions such as are commonly employed for the purpose of varying the length of the operating pedals of a motor vehicle.

At the present time there is a noticeable trend in the building of motor vehicles to provide for adjustment of certain elements of the vehicle so as to accommodate different sizes of stature in the driver of the car. This trend has generally been followed out by rendering the driver's seat adjustable so as to vary the distance of this seat from the operating pedals. General speaking, adjustment of the driver's seat of the motor vehicle constitutes quite a nuisance, and a tendency of the drivers is to disregard this adjustability, and put up with the discomfort of the seat with respect to the operating pedals for the particular driver.

The present invention proposes to supplant the adjustable seat by providing the operating pedals with attachments whereby the sufficient length of these pedals is varied. While pedal extensions of this same general character have heretofore been proposed they have met with little approval of the driving public due to certain factors which are proposed to be improved by this invention.

In providing a pedal extension of the character with which this invention is concerned the invention has in view as an important objective the provision of an auxiliary pedal which is designed to be detachably positioned in spaced relation from the main pedal, and which is supported in this position by a supporting element that constitutes what is, in effect, a continuation of the supporting arm for the main pedal. With this arrangement pressure applied to the auxiliary pedal is transmitted directly to the pedal arm, thus eliminating the possibility of breaking off the auxiliary pedal.

Due to the fact that in sudden emergencies the driver of a car is prone to quickly apply the brake pedal, it is important that this supporting structure be rigid, and designed to accommodate any great stress that may be applied thereto, and these needs are adequately taken care of by the present invention in which the support for the auxiliary pedal is a substantial continuation of the supporting arm for the main pedal.

The invention has in view as a further objective the provision of a pedal extension of the character described which is securely held in effective position, and which may be readily removed from that position into an out of the way position so as not to interfere with the use of the main pedal in the ordinary manner. A particular feature of the invention lies in the provision of means for holding the auxiliary pedal in its inoperative position.

In providing a pedal extension in accordance with the above noted objectives the invention has in view the use of an attachment which is clamped to the main pedal on the underside thereof, and which provides a pivot bolt substantially in the plane of the main pedal but spaced therefrom at a distance which may be varied in accordance with the design of the particular motor vehicle on which the attachment is to be put.

Carried by this pivot bolt is a supporting plate that is adapted to fit over the main pedal, and associated therewith is a spring clip or other suitable means for detachably securing the supporting plate in position on the main pedal. Upstanding from this supporting plate is a stud that constitutes a substantial continuation of the supporting arm for the main pedal when the plate is positioned thereover, and carried by this stud is the auxiliary pedal.

An important feature of the invention resides in the fact that by varying the length of the supporting stud variation in the adjustment afforded by the pedal is provided.

Particular features of the invention are associated with the provision of the particular type of clamping means for rigidly securing the pivot bolt in position in the plane of the main pedal.

Yet another important objective of the present invention is the provision of means for holding the auxiliary pedal immovable when it is in its ineffective position. Under practical conditions it is important that the auxiliary pedal be held against free movement when the main pedal is to be used.

Various other more detailed objects and advantages will in part become apparent and in part be hereinafter stated, as the description of the invention proceeds.

The invention, therefore, comprises a pedal extension of the character above noted which consists of a clamping attachment designed to be applied to a main operating pedal of a motor vehicle, and which clamping attachment supports a pivot bolt substantially in the plane of the main pedal. A supporting plate is pivotally carried by the pivot bolt, and is provided with means for detachably securing the same in position over the main pedal. Upstanding from the supporting plate is a supporting stud, and carried thereby is an auxiliary pedal that corresponds in shape and size to the main pedal, and assumes a position substantially parallel to the main pedal. Means are also provided for holding the auxiliary pedal immovable when it is in its ineffective out of the way position.

Figure 4:
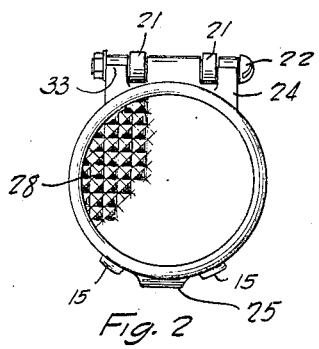
Figures 2, 3:
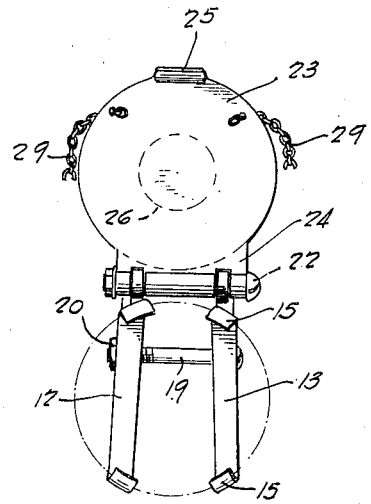

For a full and more complete understanding of the invention reference may be had to the following description and accompanying drawing, wherein Figure 1 is a side elevational showing of an operating pedal of a motor vehicle with the pedal extension of this invention applied thereto, Figure 2 is a plan view looking down on the auxiliary pedal when in effective position, Figure 3 is another plan view slightly diagrammatic with the auxiliary pedal in its ineffective position. In this view the main pedal is shown in dotted lines to clearly bring out the construction of the clamping means which is applied thereto, and Figure 4 is a side view similar to Figure 1, showing the auxiliary pedal in its opened-up position, and brings out clearly the manner in which this pedal is held immovably in this opened-up ineffective position.

Referring now to the drawing, wherein like reference characters denote corresponding parts, an operating pedal of a motor vehicle is shown in Figure 1, and referred to generally by the reference character P. It is to be understood that the operating pedal P may be either the clutch or brake pedal of a vehicle, and the particular design and various elements of the pedal may vary with different makes of cars.

The operating pedal P includes a supporting arm 10 which is substantially perpendicular with the foot engaging pedal itself, which is identified at 11. The element 11 may comprise a metal structure that is covered by rubber or other composition for antifriction purposes, and is a part well-known to those skilled in the manufacture of motor vehicles. It is important to note that while the present invention discloses the element 11 as circular, the particular shape of this element is in no way intended to be a limitation upon the invention, as this shape may vary as circumstances dictate.

At this point it is well to note that the perpendicular relationship of the pedal 11 to the supporting arm 10 is important, as it insures of a direct transmission of thrust which is applied to the pedal to the supporting arm 10.

Clamped on the under side of the pedal 11 is a clamping attachment which includes arms 12 and 13 that are formed at each end with side flanges 14 that terminate in turned-over extremities 15. These arms 12 and 13 are something short of the diameter of the pedal 11, and it will be noted that one of these arms is disposed on each side of the supporting arm 10.

Carried by each of the arms 12 and 13 are bracket members 16, which may be secured to the respective arms 12 and 13 in any preferred manner, as by brazing, welding or soldering; this being indicated at 17. At the points where the bracket members 16 are connected to the arms 12 and 13 their extremities are curled over to provide ears 18 through which passes a headed bolt 19 that carries a nut 20. It is evident that by tightening the nut 20 the members 12 and 13 are drawn towards one another, and due to the fact that these elements 12 and 13 are shorter than the diameter of the pedal 11 the flanges 15 engage the edges of the latter to positively clamp the arms 12 and 13 to the underface of the pedal 11.

The bracket members 16 are slightly inclined, and on their free extremities are curled over to provide ears 21 through which passes a pivot bolt 22 that lies substantially in the plane at the face of the pedal 11. Speaking with great accuracy this pivot bolt 22 might be said to lie slightly beneath the face of the pedal 11. A supporting plate identified at 23 is formed with a hinge extension 24 that receives the pivot bolt 22. This hinge extension 24 is cut away, as clearly shown in Figures 2 and 3, to accommodate the ears 21 of the bracket member 16.

Substantially diametrically opposite to the hinge extension 24 the supporting plate 23 is provided with a spring clip 25 that is adapted to engage about the pedal 11 to detachably secure the supporting plate 23 in position thereover; this relationship being brought out clearly in Figure 1.

It is notable that the supporting plate 23 overlies the pedal 11, and upstanding from the central portion thereof is a stud structure which includes a socket member 26. This stud structure is generally in line with the supporting arm 10, and screwed in the socket 26 is a threaded stem 27 that is carried by an auxiliary pedal identified at 28. This auxiliary pedal 28 preferably conforms in shape to the pedal 11, and may consist of a metallic structure that is covered by rubber, or other suitable friction material as will provide for a proper engagement of the driver's foot therewith.

It is notable that by varying the length of the threaded stem 27 the distance of the auxiliary pedal 28 and the main pedal 11 may be varied as occasion demands.

Attached to the supporting plate 23 are a pair of chains 29 that are joined together and connected to a spring, as shown at 30. Carried by the spring 30 is a hook member 31 which is designed to fit around the arm 10, as shown in Figure 4.

When the auxiliary pedal 28 is in the position shown in Figure 1 the hook 31 may be placed around the arm 10, and in this position hangs loose, and merely hangs out of the way. When the driver of the car applies his foot to the auxiliary pedal 28 the stresses engendered thereby are transmitted directly through the stud structure 26—27 to the main pedal 11 at the central portion thereof, which is backed by the supporting arm 10.

With this auxiliary pedal 28 in this position the car is adapted to be driven by a person of short stature. If a taller person is to drive the car the auxiliary pedal 28 is moved into the position shown in Figure 4 by applying sufficient pressure to overcome the spring clip 25. The hook 31 is then placed about the arm 10, and the spring 30 serves to yieldably maintain the auxiliary pedal 28 in its out of the way ineffective position. Each side of the hinge extension 24 is provided with a stop element 33 which limits backward swinging of the plate 23 to any desired point.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. A pedal extension of the character described comprising a clamping attachment adapted to be clamped to the operating pedal of a motor vehicle, said clamping attachment including a pivot bolt which is disposed substantially in the plane of and at one side of the pedal of the motor vehicle when the clamping attachment is applied thereto, a supporting plate pivotally carried by the pivot bolt and adapted to overlie the said operating pedal, a stud structure upstanding from the central portion of the supporting plate, and an auxiliary pedal carried by the said stud structure.

2. A pedal extension of the character described comprising a clamping attachment adapted to be clamped to the operating pedal of a motor vehicle, said clamping attachment including a pivot bolt which is disposed substantially in the plane of the pedal of the motor vehicle when the clamping attachment is applied thereto, a supporting plate pivotally carried by the pivot bolt and adapted to overlie the said operating pedal, a stud structure upstanding from the central portion of the supporting plate, an auxiliary pedal carried by the said stud structure, and means carried by the supporting plate for holding the auxiliary pedal immovable when the auxiliary pedal is in an out of the way ineffective position.

3. In combination with the operating pedal of a motor vehicle and which operating pedal includes a supporting arm substantially perpendicular thereto, a pedal extension comprising a clamping attachment adapted to be clamped to the said operating pedal, a pivot pin carried by the clamping attachment disposed substantially in the plane of the operating pedal, a supporting plate pivotally carried by the pivot pin and adapted to overlie the operating pedal in one position, means for detachably securing said supporting plate in position overlying the said pedal, a stud structure carried by the supporting plate and constituting a substantial continuation of the supporting arm for the said pedal when the supporting plate overlies the said pedal, and an auxiliary pedal carried by the said stud structure.

4. In combination with the operating pedal of a motor vehicle and which operating pedal includes a supporting arm substantially perpendicular thereto, a pedal extension comprising a clamping attachment adapted to be clamped to the said operating pedal, a pivot pin carried by the clamping attachment disposed substantially in the plane of the operating pedal, a supporting plate pivotally carried by the pivot pin and adapted to overlie the operating pedal in one position, means for detachably securing said supporting plate in position overlying the said pedal, a stud structure carried by the supporting plate and constituting a substantial continuation of the supporting arm for the said pedal when the supporting plate overlies the said pedal, tie means secured at one end to the supporting plate and having means at the other end for detachably engaging said supporting arm whereby said supporting plate may be held immovable in a position out of engagement with the said pedal, and an auxiliary pedal carried by the stud structure.

5. A pedal extension of the character described comprising a clamping attachment that includes spaced arms having flanged extremities that are adapted to clamp the edges of an operating pedal of a motor vehicle, a clamping bolt for drawing said arms towards one another to clamp the said arms on the said operating pedal, bracket members carried by said arms, a pivot bolt carried by said bracket members, a supporting plate having a hinge extension that cooperates with said pivot bolt, a spring clip carried by the supporting plate substantially diametrically opposite to said hinge extension, a threaded socket carried by said supporting plate centrally thereof, an auxiliary pedal having a threaded stem received in said threaded socket, and spring means carried by said supporting plate for holding the supporting plate and structure carried thereby immovable when the auxiliary pedal is in an ineffective position.

VIVIAN PINNOCK BAILEY.